US010195788B2

(12) United States Patent
Sanchez Ribes et al.

(10) Patent No.: US 10,195,788 B2
(45) Date of Patent: Feb. 5, 2019

(54) PRIMING AGENT DISTRIBUTORS WHILE GENERATING THREE-DIMENSIONAL OBJECTS

(71) Applicant: HEWLETT-PACKARD DEVELOPMENT COMPANY, L.P., Houston, TX (US)

(72) Inventors: Salvador Sanchez Ribes, Sabadell (ES); David Ramirez Muela, Barcelona (ES); Pol Fornos Martinez, Barcelona (ES); Sergio Puigardeu Aramendia, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/562,691

(22) PCT Filed: May 29, 2015

(86) PCT No.: PCT/US2015/033122
§ 371 (c)(1),
(2) Date: Sep. 28, 2017

(87) PCT Pub. No.: WO2016/195620
PCT Pub. Date: Dec. 8, 2016

(65) Prior Publication Data
US 2018/0086000 A1 Mar. 29, 2018

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/165* (2017.08); *B29C 64/386* (2017.08);
(Continued)

(58) Field of Classification Search
CPC .... B41J 2/17556; B29C 64/35; B29C 64/165; B29C 64/393; B33Y 10/00; B33Y 30/00;
(Continued)

(56) References Cited

U.S. PATENT DOCUMENTS 7,037,382 B2 5/2006 Davidson
8,770,714 B2 7/2014 Krichtman et al.
(Continued)

FOREIGN PATENT DOCUMENTS

WO WO-2013021173 2/2013
WO WO-2014068579 7/2014

OTHER PUBLICATIONS

"How to Avoid Clogged Nozzles"; Retrieved Jan. 26, 2015; 1 Page; http://filamentdirect.com/avoid-clogged-nozzles.

*Primary Examiner* — Anh T. N. Vo
(74) *Attorney, Agent, or Firm* — HP Inc. Patent Department (57) ABSTRACT

In some examples, an agent distributor may be to selectively deliver agent through nozzles of the agent distributor to portions of layers of build material in patterns derived from agent delivery control data representing slices of a three-dimensional object such that the portions are to solidify to form the slices in accordance with the patterns. While generating the three-dimensional object, the agent distributor may be primed such that a particle of the build material is removed from the agent distributor through at least one of the nozzles.

20 Claims, 4 Drawing Sheets

(51) Int. Cl.
*B33Y 10/00* (2015.01)
*B33Y 30/00* (2015.01)
*B33Y 50/02* (2015.01)
*B29C 64/386* (2017.01)

(52) U.S. Cl.
CPC .............. *B33Y 10/00* (2014.12); *B33Y 30/00* (2014.12); *B33Y 50/02* (2014.12)

(58) Field of Classification Search
CPC .......... B33Y 50/02; G05B 2219/49007; G05B 2219/49008; G05B 2219/49021
See application file for complete search history.

(56) References Cited

U.S. PATENT DOCUMENTS

| | | |
|---|---|---|
| 9,533,526 B1 * | 1/2017 | Nevins ................... B33Y 80/00 |
| 2006/0061618 A1 | 3/2006 | Hernandez |
| 2006/0111807 A1 | 5/2006 | Gothait |
| 2007/0238056 A1 | 10/2007 | Baumann |
| 2013/0314465 A1 | 11/2013 | Lebronn |
| 2014/0027952 A1 | 1/2014 | Fan et al. |
| 2014/0203479 A1 | 7/2014 | Teken |
| 2016/0176113 A1 * | 6/2016 | Donaldson .......... B29C 67/0088 428/195.1 |
| 2017/0173865 A1 * | 6/2017 | Dikovsky ............. B29C 67/007 |
| 2017/0220031 A1 * | 8/2017 | Morovic, Jr. ...... G05B 19/4099 |

* cited by examiner

PRIMING AGENT DISTRIBUTORS WHILE GENERATING THREE-DIMENSIONAL OBJECTS

BACKGROUND

Additive manufacturing systems that generate three-dimensional objects on a layer-by-layer basis have been proposed as a potentially convenient way to produce three-dimensional objects. Agent distributors such as printheads may be used to deliver agents as part of the process of generating three-dimensional objects.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered, liquid, or fluidic build material. The properties of generated objects may be dependent on the type of build material and the type of solidification mechanism used. In some examples, solidification may be achieved by using an agent distributor to deliver a binder agent which binds and solidifies build material into a binder matrix, which is a mixture of generally separate particles or masses of build material that are adhesively bound together by a binder agent. In other examples, solidification may be achieved by temporary application of energy to the build material using an agent distributor. This may, for example, involve use of a coalescing agent, which is a material that, when a suitable amount of energy is applied to a combination of build material and coalescing agent, may cause the build material to coalesce and solidify. In some examples, a multiple agent additive manufacturing system may be used such as that described in PCT Application No. PCT/EP2014/050841 filed on Jan. 16, 2014, entitled "GENERATING A THREE-DIMENSIONAL OBJECT", the entire contents of which are hereby incorporated herein by reference. For example, in addition to selectively delivering coalescing agent to layers build material, coalescence modifier agent may also be selectively delivered to layers of build material. A coalescence modifier agent may serve to modify the degree of coalescence of a portion of build material on which the coalescence modifier agent has been delivered or has penetrated. In yet other examples, other methods of solidification may be used, for example selective laser sintering (SLS), light polymerization, among others. The examples described herein may be used with any of the above additive manufacturing systems and suitable adaptations thereof.

In some examples, agent distributors may malfunction due to particles of build material becoming lodged in nozzles or fluid feed channels of agent distributors. For example, a nozzle bore may be 15 micrometers in diameter, and some particles of build material may have smaller diameters than 15 micrometers. This may cause agent not to be delivered or to be delivered in lesser quantities than intended. Thus, the object being generated may experience a lesser degree of solidification than intended or portions of the build material may not solidify as intended. In some examples, poor object properties may result, such as poor surface properties, accuracy, strength, or inter-layer bonding. Accordingly, in some examples, the present disclosure provides for priming agent distributors while generating three-dimensional objects to remove, from the agent distributor through its nozzles, particles that may, for example, be lodged in a nozzle or fluid feed channel. As understood herein, "while generating a three-dimensional object" refers to any time between starting the process of generating the object and completing the process of generating the object. Additionally, as understood herein, "priming" an agent distributor means removing a particle from the agent distributor, but not for the purpose of printing. "Blow priming" means using forward pressure to remove a particle from an agent distributor through its nozzle, as opposed to spitting in which a particle may be pulled out of the nozzle, and as opposed to a wiping a surface of an agent distributor. As understood herein, a "particle" of build material is a mass of build material, for example in solid or liquid form.

Figure 1:
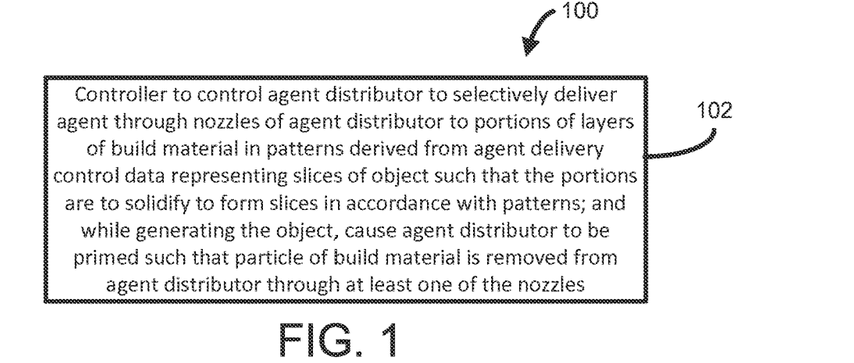
FIG. 1 illustrates an additive manufacturing system according to some examples.

FIG. 1 is a block diagram illustrating an additive manufacturing system 100 according to some examples. The additive manufacturing system 100 may include a controller 102 which may be to control an agent distributor to selectively deliver agent through nozzles of the agent distributor to portions of layers of build material in patterns derived from agent delivery control data representing slices of a three-dimensional object such that the portions are to solidify to form the slices in accordance with the patterns. The controller 106 may be to cause, while generating the three-dimensional object, the agent distributor to be primed such that a particle of the build material is removed from the agent distributor through at least one of the nozzles.

Figure 2:
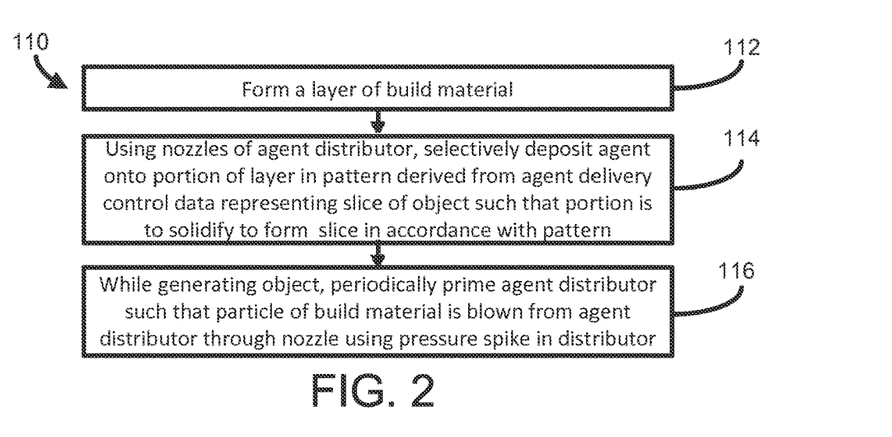
FIG. 2 is a flow diagram illustrating a method according to some examples.

FIG. 2 is a flow diagram illustrating a method 110 according to some examples. At 112, a layer of build material may be formed. At 114, an agent may be selectively deposited using nozzles of an agent distributor onto a portion of the layer of the build material in a pattern derived from agent delivery control data representing a slice of a three-dimensional object such that the portion is to solidify to form the slice in accordance with the pattern. At 116, while generating the three-dimensional object, the agent distributor may be periodically primed such that a particle of the build material is blown from the agent distributor through at least one of the nozzles using a pressure spike in the agent distributor.

Figure 3:
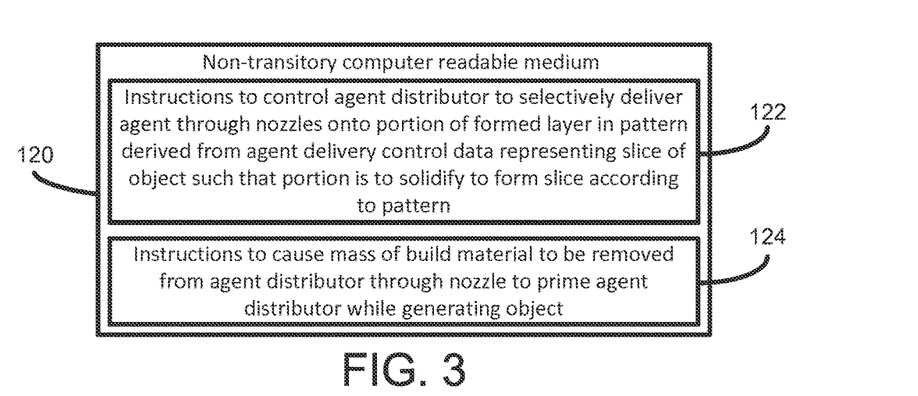
FIG. 3 is a block diagram illustrating a non-transitory computer readable storage medium according to some examples.

FIG. 3 is a block diagram illustrating a non-transitory computer readable storage medium 120 according to some examples. The non-transitory computer readable medium 120 may include executable instructions 122 that, when executed by a processor, may cause the processor to control an agent distributor having nozzles to selectively deliver an agent onto a portion of a formed layer of build material in a pattern derived from agent delivery control data representing a slice of a three-dimensional object such that the portion is to solidify to form the slice according to the pattern. The non-transitory computer readable medium 120 may include executable instructions 124 that, when executed by a processor, may cause the processor to cause a mass of the build material to be removed from the agent distributor through at least one of the nozzles to prime the agent distributor while generating the three-dimensional object.

Figure 4A:
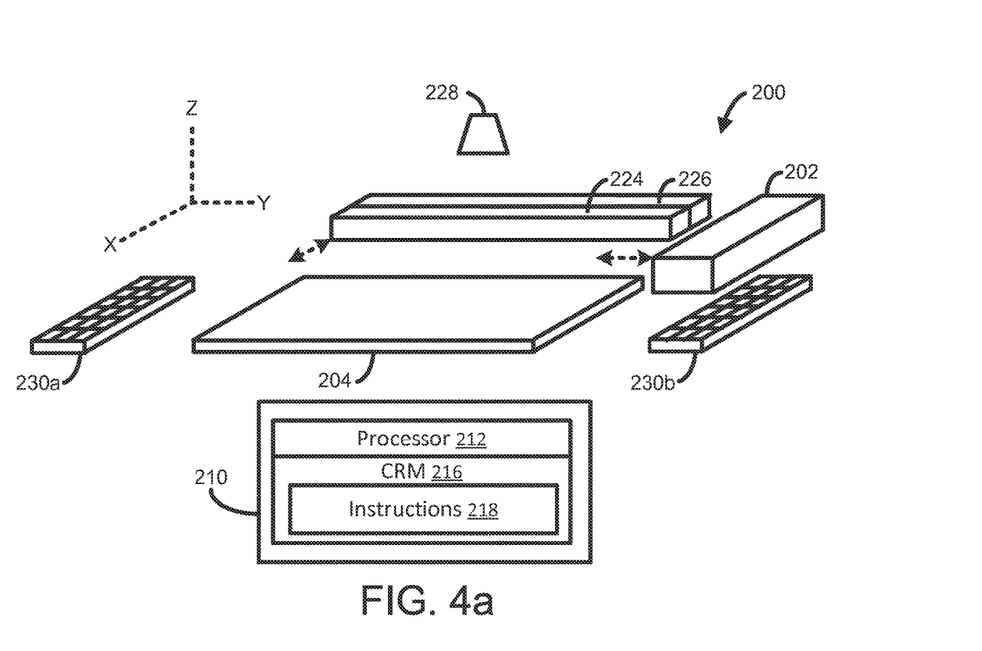
FIG. 4a is a simplified isometric illustration of an additive manufacturing system according to some examples.
Figure 4B:
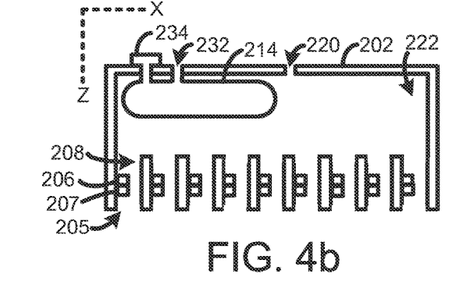
FIG. 4b is a simplified cross-sectional schematic side view of an agent distributor while not priming according to some examples.
Figure 4C:
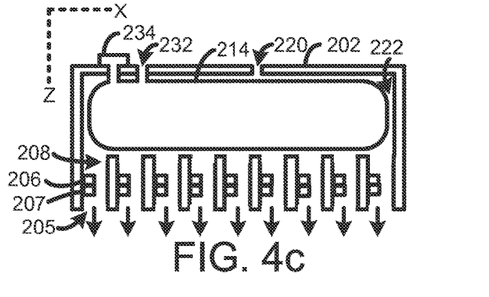
FIG. 4c is a simplified cross-sectional schematic side view of an agent distributor while priming according to some examples.

FIG. 4a is a simplified isometric illustration of an additive manufacturing system 200 according to some examples. The system 200 may include an agent distributor 202. FIG. 4b is a simplified cross-sectional schematic side view of the agent distributor 202 while not priming according to some examples. FIG. 4c is a simplified cross-sectional schematic side view of the agent distributor 202 while priming according to some examples. The system 200 may be operated, as described further below with reference to the flow diagram of FIG. 5 to generate a three-dimensional object.

In some examples the build material may be a powder-based build material. As used herein the term powder-based materials is intended to encompass both dry and wet powder-based materials, particulate materials, granular, and fluidic materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein (e.g. in FIG. 5) may be implemented and controlled in the additive manufacturing system 200 and/or controller 210. A controller, as understood herein, comprises (1) a non-transitory computer-readable storage medium comprising instructions to perform operations and methods disclosed herein, and a processor coupled to the non-transitory computer-readable storage medium to execute the instructions; or comprises (2) circuitry to perform the operations and methods disclosed herein.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

In some examples, the controller 210 may support direct user interaction. For example, the additive manufacturing system 200 may include user input devices coupled to the processor 212, such as a keyboard, touchpad, buttons, keypad, dials, mouse, track-ball, card reader, or other input devices. Additionally, the additive manufacturing system 200 may include output devices coupled to the processor 212, such as a liquid crystal display (LCD), video monitor, touch screen display, a light-emitting diode (LED), or other output devices. The output devices may be responsive to instructions to display textual information or graphical data.

The processor 212 may be in communication with a computer-readable storage medium 216 via a communication bus. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples.

In other examples, the controller 210 may not include a computer-readable storage medium 216, and the processor may comprise circuitry to perform any of the methods or operations disclosed herein without executing separate instructions in a computer-readable storage medium.

The system 200 may include an agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CM993A and CE042A available from Hewlett-Packard Company.

Although the description of agent distributor 202 is described herein as delivering coalescing agent, it is understood that in some examples, binder agent may be delivered by the agent distributor 202 rather than coalescing agent. Thus, the term "agent" is understood to encompass both coalescing agent and binder agent.

The controller 210 may control the selective delivery of coalescing agent to a layer of provided build material in accordance with the instructions 218.

The agent distributor 202 may be used to selectively deliver, e.g. deposit, coalescing agent when in the form of a suitable fluid such as liquid. The agent distributor 202 may be a printhead, such as a thermal inkjet printhead or a piezo inkjet printhead. In some examples, the agent distributor 202 may have an array of nozzles 205 through which the agent distributor 202 is able to selectively eject drops of fluid, as shown in FIGS. 4*b-c*. In some examples, each drop may be in the order of about 10 Pico liters (pl) per drop, although in other examples the agent distributor 202 is able to deliver a higher or lower drop size. In some examples the agent distributor 202 is able to deliver variable size drops.

In some examples the coalescing agent may comprise a liquid carrier, such as water or any other suitable solvent or dispersant, to enable it to be delivered via a printhead.

In some examples the printheads may be drop-on-demand printhead. In other examples the printhead may be continuous drop printhead.

In some examples, the agent distributor 202 may be an integral part of the system 200. In some examples, the agent distributor 202 may be user replaceable, in which case they may be removably insertable into a suitable agent distributor receiver or interface module of the system 200.

In the example illustrated in FIG. 4*a*, the agent distributor 202 may have a length that enables it to span the whole width of the support member 204 in a so-called page-wide array configuration. In one example this may be achieved through a suitable arrangement of multiple printheads. In other examples a single printhead having an array of nozzles 205 having a length to enable them to span the width of the support member 204 may be used. In other examples, the agent distributor 202 may have a shorter length that does not enable it to span the whole width of the support member 204.

The agent distributor 202 may be mounted on a moveable carriage to enable it to move bi-directionally across the length of the support 204 along the illustrated y-axis. This enables selective delivery of coalescing agent across the whole width and length of the support 204 in a single pass. In other examples the agent distributor 202 may be fixed, and the support member 204 may move relative to the agent distributor 202.

In other examples the agent distributors may be fixed, and the support member 204 may move relative to the agent distributors.

It should be noted that the term 'width' used herein is used to generally denote the shortest dimension in the plane parallel to the x and y axes illustrated in FIG. 4*a*, whilst the term 'length' used herein is used to generally denote the longest dimension in this plane. However, it will be understood that in other examples the term 'width' may be interchangeable with the term 'length'. For example, in other examples the agent distributor 202 may have a length that enables them to span the whole length of the support member 204 whilst the moveable carriage may move bi-directionally across the width of the support member 204.

In another example the agent distributor 202 does not have a length that enables it to span the whole width of the support member but are additionally movable bi-directionally across the width of the support member 204 in the illustrated x-axis. This configuration enables selective delivery of coalescing agent across the whole width and length of the support 204 using multiple passes. Other configurations, however, such as a page-wide array configuration, may enable three-dimensional objects to be created faster.

As shown in FIGS. 4*b-c*, the agent distributor 202 may include a chamber 222 which may be to hold coalescing agent. The chamber 222 may be to receive coalescing agent through a fluid inlet 220 from a conduit connected to a supply of coalescing agent, and may be to provide coalescing agent to a plurality of fluid feed channels 208. In some examples, the agent distributor 202 may include its own supply of coalescing agent. Each of the fluid feed channels 208 may lead to a respective nozzle 205. Each of the fluid feed channels 208 may also include a respective actuator 206 which may be positioned adjacent to the nozzle 205, and may include a respective nozzle sensor 207, which may be positioned adjacent to the nozzle 205. If the agent distributor 202 is a thermal inkjet printhead, the actuator 206 may be a resistor that, when actuated, may create a bubble that causes coalescing agent in the fluid feed channel 208 to be ejected from the nozzle 205 for printing. If the agent distributor 202 is a piezo inkjet printhead, the actuator 206 may be a piezoelectric actuator.

In the example of FIGS. 4*b-c*, the chamber 222 may also include a pressure regulator 214. The pressure regulator 214 may be an inflatable bag that is vented to the atmosphere through a vent 232 on the agent distributor 202. In other examples, any other suitable regulators may be used.

In FIG. 4*b*, the pressure regulator 214 is shown at atmospheric pressure in a deflated state as a result of venting to the atmosphere through the vent 232. The chamber 222 may be designed such that when the pressure regulator 214 is at atmospheric pressure, the chamber 222 and fluid feed channels 208 are maintained at a backpressure (i.e. negative pressure) that opposes the flow of coalescing agent in through the fluid feed channels 208 and nozzles 205. This may prevent coalescing agent from being ejected from the nozzles 205. Thus, the agent distributor 202 may not be priming in the state shown in FIG. 4*b*. However, actuation of the actuator 206 may create forward pressure opposing the backpressure to cause ejection of coalescing agent through the nozzles 205 for printing, as discussed earlier.

In FIG. 4*c*, the pressure regulator 214 is shown in an inflated state. This may achieved by pumping air into the pressure regulator 214 using air pump 234. As shown in FIG. 4*c*, the process of inflating the pressure regulator 214 may cause a spike in forward pressure which blows coalescing agent in the chamber 222 and/or fluid feed channels 208 through the nozzles 205. The spike in forward pressure may also blow any particles of build material lodged in the fluid feed channel 208 and/or nozzle 205 through the nozzles 205 to achieve priming. This process of using forward pressure to blow a particle out of the nozzle 205 is known as a blow prime, as discussed earlier.

A respective nozzle sensor 207 may be coupled to each nozzle 205. The nozzle sensor 207 may, for example, be a drop detector. Each sensor 207 may be to detect whether its respective nozzle 205 is malfunctioning, e.g. partially or completely clogged by particles of build material. In some examples, the drop detector may include a light emitting diode (LED) and a photoreceptor, such as a photodiode or charge coupled device (CCD), on separate sides of the fluid path in the nozzle. The LED may generate light, and the photoreceptor may detect the light from the LED, creating a light path which may be substantially perpendicular to the fluid path. A disruption in the light path may occur when a drop of fluid passes through the light path. Thus, it may be inferred that if reduced disruptions of the light path are detected, then the nozzle 205 is partially clogged, and if no disruptions of the light path are detected, then the nozzle 205 is completely clogged. In other examples, the drop detector may include an electrostatic detection mechanism in which a passing drop of fluid may cause an electrostatic differential on a plate. In other examples, the agent distributor 202 may be to perform indexing movements along the x-axis to allow each nozzle to attempt to deliver agent on build material at different locations along the x-axis. Then, an optical sensor may be moved along the carriage to detect, for each nozzle 205, whether any drops of agent were not successfully delivered, indicating that the respective nozzle 205 is clogged. In other examples, other types of sensors 207 may be used. In some examples, each nozzle sensor 207 may detect how many drops have been ejected by its respective nozzle 205. In some examples, other types of sensors may be used. Data representing any of the above measurements may be provided to the controller 210.

In some examples, based on the measurements, the controller 210 may determine usage of the nozzles 205, for example the total amount of drops delivered by the nozzle 205 in its lifetime, the frequency of the usage of the nozzle 205, and/or whether the nozzle 205 has not been used for more than a predetermined amount of time, etc. In other examples, the controller 210 may instead generate the data based on instructions 218 such as the agent delivery control data, which may define drops of agent to be delivered by each nozzle 205.

The system 200 may further comprise a build material distributor 224 to form successive layers of build material on the support member 204. Suitable build material distributors 224 may include, for example, a wiper blade and a roller. Build material may be supplied to the build material distributor 224 from a hopper or build material store. In the example shown the build material distributor 224 moves across the width (x-axis) of the support member 204 to form a layer of build material. As previously described, a layer of build material may be formed on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on a carriage.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the instructions 218.

In some examples, there may be any number of additional agent distributors and build material distributors relative to the distributors shown in FIGS. 4a-c. In some examples, the some distributors of system 200 may be located on the same carriage, either adjacent to each other or separated by a short distance. In other examples, two or more carriages each may contain a distributor. For example, each distributor may be located in its own separate carriage. Any additional distributors may have similar features as those discussed earlier with reference to the agent distributor 202. However, in some examples, different agent distributors may deliver different coalescing agents and/or coalescence modifier agents, for example.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

In some examples, the system 200 may include priming stations 230a-b. The priming stations 230a-b may be positioned in a line along the y-axis. For example, one priming station 230a may be positioned adjacent to one side of the support member 204, and another priming station 230b may be positioned adjacent to an opposing side of the support member 204. The agent distributor 202 may be movable across the y-axis to be stationed at either of the priming stations 230a-b after delivering coalescing agent. The priming stations 230a-b may include any suitable components to aid in priming.

In some examples, as shown in FIG. 4a, each of the priming stations 230a-b may comprise a web made of a cloth. The web may be coated with a liquid such as polyethylene glycol (PEG) which may serve as a cleaning agent. When priming over either of the priming stations 230a-b, coalescing agent and/or particles of build material may be ejected onto either of the priming stations 230a-b. Then, the web may be lifted along the z-axis to contact and wipe the nozzles 205 to remove any coalescing agent and/or particles of build material accumulated on the surface of the agent distributor 202 around the nozzles 205. In some examples, different portions of the web may be used for different instances of wiping. For example, each portion of the web may be used for a predetermined number of wipes, and once the predetermined number is reached, a different portion of the web may be used. Once all portions of the web have been used a predetermined number of times, then the system 200 may provide an alert that the web is to be replaced.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In other examples, the energy source 226 may be to apply energy in a substantially uniform manner to a portion of the whole surface of a layer of build material. For example, the energy source 226 may be to apply energy to a strip of the whole surface of a layer of build material. In these examples, as shown in FIG. 4a, the energy source may be moved or scanned across the layer of build material, e.g. along the x-axis, such that a substantially equal amount of energy is ultimately applied across the whole surface of a layer of build material.

In some examples, the energy source 226 may be to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In some examples, the energy source 226 may be mounted on the moveable carriage, for example the same carriage on which the build material distributor 224 is mounted.

In other examples, the energy source 226 may apply a variable amount of energy as it is moved across the layer of build material, for example in accordance with instructions 218. For example, the controller 210 may control the energy source to apply energy to portions of build material on which coalescing agent has been applied but not to portions of build material on which coalescing agent has not been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that portions of the build material on which no coalescing agent have been delivered do not coalesce when energy is temporarily applied thereto, and portions of the build material on which coalescing agent has been delivered or has penetrated coalesce when energy is temporarily applied thereto do coalesce.

Although not shown in FIG. 4a, in some examples the system 200 may additionally comprise a heater to maintain build material deposited on the support member 204 within a predetermined temperature range. Use of a heater may help reduce the amount of energy that has to be applied by the energy source 226 to cause coalescence and subsequent solidification of build material on which coalescing agent has been delivered or has penetrated.

The system 200 may additionally include a sensor 228 for detecting temperature in the system 200, such as a temperature of the build material and/or an ambient temperature of air adjacent the nozzles 205. In some examples, the sensor 228 may be a point contactless temperature sensor such as a thermopile to detect temperature gradients in the system 200. In some examples, the sensor 228 may be a thermographic camera to capture radiation from the build material. In some examples, the sensor 228 may include an array of fixed-location pyrometers which each capture radiation from a single area of the build material. In some examples, the sensor 228 may be a single pyrometer which may be operable to sweep or scan over the entire area of the build material. In some examples, any suitable sensor 228 to measure ambient temperature may be used, such as a mercury-in-glass thermometer. Other types of sensors may also be used.

In FIG. 4a, the sensor 228 is shown as a thermographic camera. In this example, the sensor 228 may be to capture a radiation distribution, for example in the IR range, emitted by each point of the build material across the area spanned by the build material on the support member 204. The sensor 228 may output the radiation distribution to the controller 210, which may determine a temperature for each area across the build material based on known relationships, such as a black body distribution, between temperature and radiation intensity for the material used as the build material. For example, the radiation frequencies of the radiation distribution may have their highest intensities at particular values in the infra-red (IR) range. Each temperature may correspond to a particular area of the build material, wherein each of the areas collectively define an entire area of the build material print bed.

Figure 5:
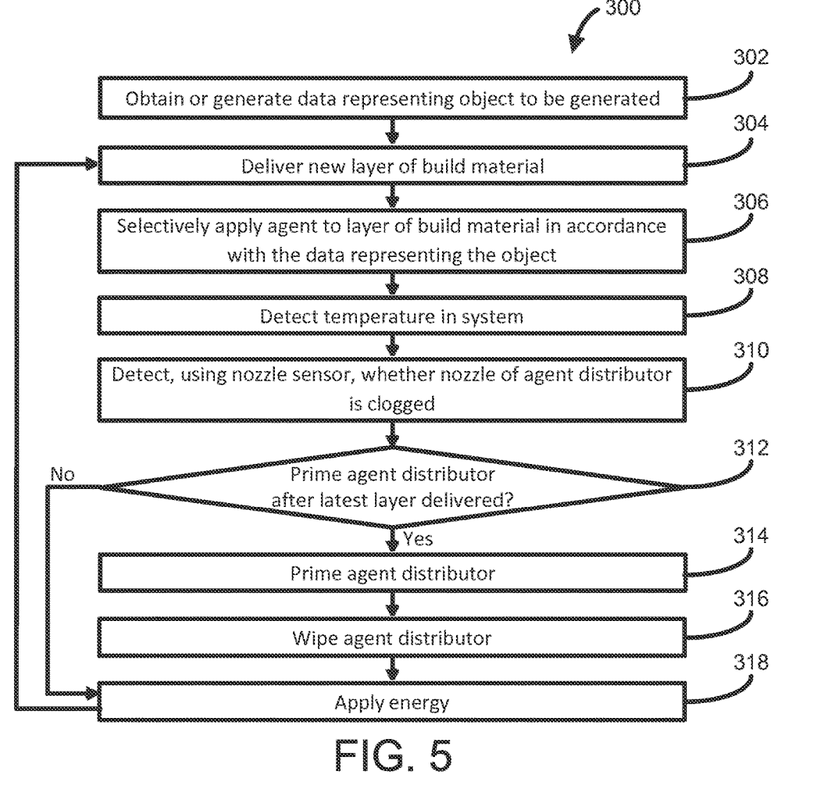
FIG. 5 is a flow diagram illustrating a method of generating a three-dimensional object according to some examples.

FIG. 5 is a flow diagram illustrating a method 300 of generating a three-dimensional object according to some examples. In some examples, the orderings shown may be varied, some elements may occur simultaneously, some elements may be added, and some elements may be omitted. In describing FIG. 5, reference will be made to FIGS. 4a-c and 6a-f. FIGS. 6a-f show a series of cross-sectional side views of layers of build material according to some examples.

At 302, the controller 210 may obtain or generate agent delivery control data which may define for each slice of the three-dimensional object to be generated the portions or the locations on the build material, if any, at which agent is to be delivered. The agent delivery control data may be stored as part of the instructions 218.

In some examples, the agent delivery control data may be generated based on object design data representing a three-dimensional model of an object to be generated, and/or from object property data representing properties of the object. The model may define the solid portions of the object, and may be processed by the three-dimensional object processing system to generate slices of parallel planes of the model. Each slice may define a portion of a respective layer of build material that is to be solidified by the additive manufacturing system 200. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

The agent delivery control data may describe, for each layer of build material to be processed, locations or portions on the build material at which coalescing agent is to be delivered. In one example the locations or portions of the build material at which coalescing agent is to be delivered are defined by way of respective patterns.

Figure 6A:
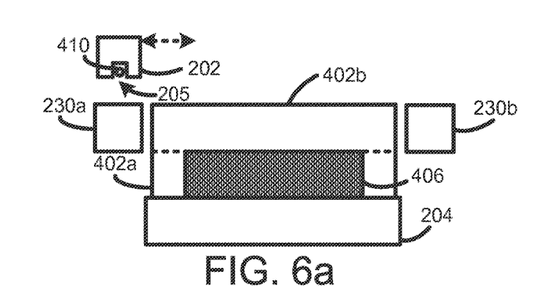
FIGS. 6a-f show a series of cross-sectional side views of layers of build material according to some examples.

At 304, a layer 402b of build material may be formed, as shown in FIG. 6a. For example, the controller 210 may control the build material distributor 224 to form the layer 402b on a previously completed layer 402a on the support member 204 by causing the build material distributor 224 to move along the x-axis as discussed earlier. The completed layer 402a may include a solidified portion 406. Although a completed layer 402a is shown in FIGS. 6a-f for illustrative purposes, it is understood that 304 to 318 may initially be applied to generate the first layer 402a.

As shown, the agent distributor 202 may include a particle 410 of build material that has been lodged in the fluid feed channel 208 and/or nozzle 205 to partially or completely clog the nozzle 205. The particle 410 may have become lodged while the build material distributor 224 delivered the layer 402b of build material, for example because particles from the layer 420b may fallen into the nozzle 205. In other examples, the particle 410 may have been lodged during any of 304 to 318 while generating the first layer 402a.

In some examples, the layer 402b of build material may be heated by a heater to heat and/or maintain the build material within a predetermined temperature range. The predetermined temperature range may, for example, be below the temperature at which the build material would experience bonding in the presence of coalescing agent 404. For example, the predetermined temperature range may be between about 155 and about 160 degrees Celsius, or the range may be centered at about 160 degrees Celsius. Preheating may help reduce the amount of energy that has to be applied by the energy source 226 to cause coalescence and subsequent solidification of build material on which coalescing agent has been delivered or has penetrated.

Figure 6B:
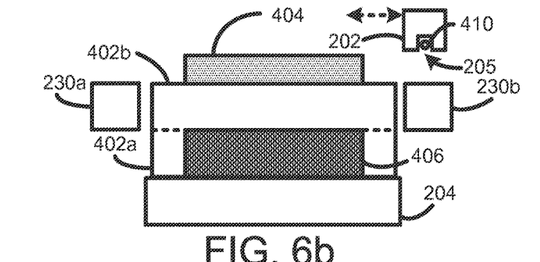

At 306, as shown in FIG. 6b, coalescing agent 404 may be selectively delivered to the surface of portions of the layer 402b. As discussed earlier, the agent 404 may be delivered by agent distributor 202, for example in the form of fluids such as liquid droplets. In some examples, binder agent may be used rather than coalescing agent.

The selective delivery of the agent 404 may be performed in patterns on the portions of the layer 402b that the data representing the three-dimensional object may define to become solid to form part of the three-dimensional object being generated, "Selective delivery" means that agent may be delivered to selected portions of the surface layer of the build material in various patterns.

Figure 6C:
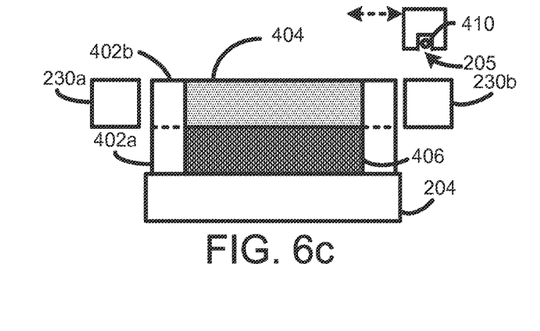

FIG. 6c shows coalescing agent 404 having penetrated substantially completely into the portions of the layer 402b of build material, but in other examples, the degree of penetration may be less than 100%. The degree of penetration may depend, for example, on the quantity of agent delivered, on the nature of the build material, on the nature of the agent, etc.

At 308, the sensor 228 may detect a temperature of the system 200, for example a temperature of ambient air adjacent to the nozzles 205 or a temperature of build material of the layer 402b, as discussed earlier. Data from the sensor 228 may be received by the controller 210.

At 310, respective sensors 207 in each of the fluid feed channels 208 may detect whether the fluid feed channels 208 and/or nozzles 205 are partially or completely clogged, as discussed earlier. Data from the sensors 207 may be received by the controller 210.

At 312, the controller 210 may determine whether to prime the agent distributor 202 after the latest layer 402b of build material has been formed and coalescing agent has been delivered to the build material. If the controller may determine that priming is to be performed in the current iteration of 304 or 318, the method 300 may proceed to 314, otherwise the method 300 may proceed to 318.

In some examples, priming may be performed in response to sensor feedback from the system 200.

In some examples, if any of the nozzle sensors 208 detect that any nozzles 205 are partially or completely clogged, or that a threshold number of nozzles 205 are partially or completely clogged, then the controller 210 may determine that priming is to be performed in the current iteration of 304 to 318. In some examples, if the nozzle sensors 208 do not detect that any nozzles 205 are partially or completely clogged, or that fewer than a threshold number of nozzles 205 are partially or completely clogged, then the controller 210 may determine that priming is not to be performed in the current iteration of 304 to 318.

In some examples, the sensor 228 may detects a temperature of build material or an ambient temperature of air adjacent to the nozzles 205. The controller 210 may determine that the detected temperature represents an environment or condition in which nozzle clogging is more likely, and therefore the controller 210 may determine that priming is to be performed in the current iteration of 304 or 318. Otherwise, the controller 210 may determine that priming is not to be performed in the current iteration of 304 to 318.

In some examples, the controller 210 may track usage of nozzles 205 for printing, based on measurements by nozzle sensors 208 or based on agent delivery control data, as discussed earlier. If a threshold amount firings of nozzle 205 have taken place since the last prime, then the controller 210 may determine that priming is to be performed in the current iteration of 304 to 318. Otherwise, the controller 210 may determine that priming is not to be performed in the current iteration of 304 to 318.

In some examples, priming is to be performed every threshold number of layers. The threshold may be predetermined.

In some examples, the threshold may be one layer, meaning that priming may be performed after forming every layer. In this example, the agent distributor 202 may be primed on different priming stations 230a-b for each prime. For example, priming after the first layer 402a may occur over the priming station 230a, after which the agent distributor 202 may move across the y-axis to deliver agent 404. Then, priming after the second layer 402b may occur over the priming station 230b. Priming after subsequent layers may then continue in a pattern alternating between the priming station 230a and 230b.

In some examples, the threshold may be multiple layers, for example a threshold having a value between 2 layers and 100 layers. In an example, the threshold may be 40 layers, meaning that priming may be performed after forming every 40th layer. If the threshold is an even number, then the same priming station may be used. This may be suitable in examples where there is one priming station rather than two priming stations. If the threshold number is an odd number, then alternating priming stations may be used for each prime.

In some examples, the threshold may be selected, or the predetermined threshold may be modified, based on feedback from sensor 228 and nozzle sensors 208. For example, if nozzles are clogging often based on measurements by the nozzle sensors 208, then the controller 210 may reduce the threshold to increase the frequency of priming. In another example, if temperature conditions are present which may be expected to increase clogging, then the controller 210 may reduce the threshold to increase the frequency of priming If the threshold has been reached in a current iteration of 304 to 318, then the controller may determine that priming is to be performed in the current iteration of 304 or 318. Otherwise, the controller 210 may determine that priming is not to be performed in the current iteration of 304 to 318.

Figure 6D:
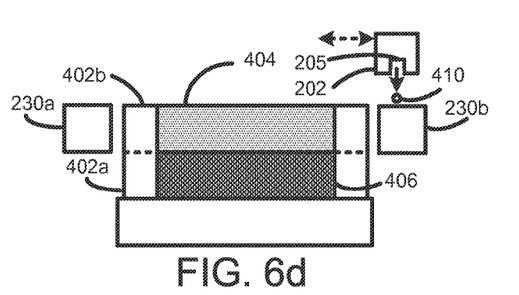

At 314, the agent distributor 202 may be primed according the examples discussed earlier. For example, in a blow prime, the air pump 234 may pump air into the pressure regulator 214 to inflate the regulator 214, thereby causing a spike in forward pressure which may blow build material particles and/or coalescing agent in the chamber 222 and/or fluid feed channels 208 through the nozzles 205. In the example of FIG. 6d, the particle 410 of build material, which was lodged in a fluid feed channel 208 and/or nozzle 205, is shown being ejected as a result of the blow prime. In some examples, the blow prime may take about 1 to about 2 seconds.

Figure 6E:
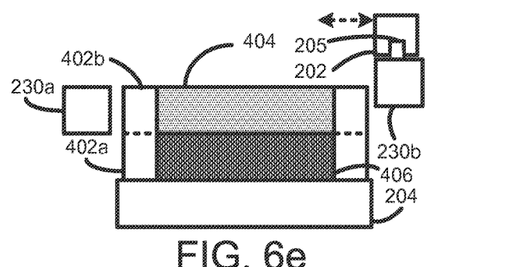

At 316, as shown in FIG. 6e, the web of the cleaning station 230b may be lifted along the z-axis to contact and wipe the nozzles 205 to remove any coalescing agent and/or particles of build material accumulated on the surface of the agent distributor 202 around the nozzles 205 as a result of the blow prime. In some examples, the wiping may take about 1 to about 2 seconds.

At 318, a predetermined level of energy may be temporarily applied to the layer 402b of build material. In various examples, the energy applied may be infra-red or near infra-red energy, microwave energy, ultra-violet (UV) light, halogen light, ultra-sonic energy, or the like. The temporary application of energy may cause the portions of the build material on which coalescing agent 404 was delivered to heat up above the melting point of the build material and to coalesce. In some examples, the energy source 226 may be focused. In some examples in which the energy source 226 is focused, the energy source 226 may cause coalescence of build material without use of coalescing agent 404, but in other examples coalescing agent 404 may be used. In other examples, the energy source 226 may be unfocused, and the temporary application of energy may cause the portions of the build material on which coalescing agent 404 has been delivered or has penetrated to heat up above the melting point of the build material and to coalesce. For example, the temperature of some or all of the layer 402b may achieve about 220 degrees Celsius. Upon cooling, the portions having coalescing agent 404 may coalesce may become solid and form part of the three-dimensional object being generated, as shown in FIG. 6f.

As discussed earlier, one such solidified portion 406 may have been generated in a previous iteration. The heat absorbed during the application of energy may propagate to the previously solidified portion 406 to cause part of portion 406 to heat up above its melting point. This effect helps creates a portion 408 that has strong interlayer bonding between adjacent layers of solidified build material, as shown in FIG. 6f.

In some examples, the energy may not be applied, for example if binder agent is used, or if the coalescing agent 404 is to cause coalescence and solidification of build material without use of the energy source 226.

Figure 6F:
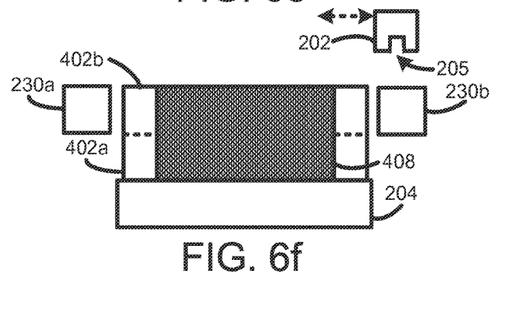

In the example of FIGS. 6d-f, priming and wiping are shown as completed before the portion having coalescing agent 404 in layer 402b coalesces and solidifies. However, in examples, the priming and wiping may occur while energy is applied to cause coalescence and solidification, and while the next layer of build material is formed after coalescence and solidification of layer 402b. Since the process of coalescence and solidification and forming a new layer of build material may take 4 to 5 seconds in some examples, the priming and cleaning may be performed without slowing down generation of the three-dimensional object.

In some examples, 312 to 316 may occur at any time, periodically, and/or continuously throughout the build process. For example, 312 to 316 may be performed at different times, such as after 304 but before 306, or such as after 318 before returning to 304.

After a layer of build material has been processed as described above in 304 to 318, new layers of build material may be provided on top of the previously processed layer of build material. In this way, the previously processed layer of build material acts as a support for a subsequent layer of build material. The process of 304 to 318 may then be repeated to generate a three-dimensional object layer by layer.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An additive manufacturing system comprising:
a controller to:
control an agent distributor to selectively deliver agent through nozzles of the agent distributor to portions of layers of build material in patterns derived from agent delivery control data representing slices of a three-dimensional object such that the portions are to solidify to form the slices in accordance with the patterns; and
a pressure regulator in the agent distributor to apply a forward pressure to blow a particle of build material from the agent distributor out of at least one of the nozzles such that, while generating the three-dimensional object, the pressure regulator to cause the agent distributor to be primed such that a particle of the build material is removed from the agent distributor through at least one of the nozzles.

2. The additive manufacturing system of claim 1 wherein the controller is to cause the agent distributor to be blow primed.

3. The additive manufacturing system of claim 2, wherein the pressure regulator is further comprising an inflatable bag in the agent distributor, the inflatable bag, when inflated, creating the forward pressure sufficient to force the particle of the build material from the agent distributor through at least one of the nozzles.

4. The additive manufacturing system of claim 1 further comprising an air pump coupled to the pressure regulator to inflate the pressure regulator to apply the forward pressure to force the particle of the build material from the agent distributor through at least one of the nozzles.

5. The additive manufacturing system of claim 1 wherein the controller is to cause the agent distributor to be primed periodically after a predetermined threshold number of the layers have been formed since a previous prime.

6. The additive manufacturing system of claim 5 further comprising a sensor to obtain feedback from the system, wherein the predetermined threshold number is modified based on feedback.

7. The additive manufacturing system of claim 1 further comprising a sensor to obtain feedback from the system, wherein the controller is to cause the agent distributor to be primed based on the feedback.

8. The additive manufacturing system of claim 7 wherein the sensor is a temperature sensor and the feedback represents a temperature of build material or ambient air in the system.

9. The additive manufacturing system of claim 7 wherein the sensor is a nozzle sensor and the feedback represents that the nozzle is partially or completely clogged by the particle of the build material.

10. The additive manufacturing system of claim 1 wherein the controller is to cause the agent distributor to be primed based on nozzle usage data representing that the nozzle has been used a threshold number of times.

11. The additive manufacturing system of claim 1 further comprising a priming station to receive the particle of build material after the agent distributor is primed, wherein the priming station comprises a web to wipe a surface of the agent distributor having the nozzles, wherein the controller is to cause the web to wipe the surface after the agent distributor is primed.

12. The additive manufacturing system of claim 1 wherein the agent distributor is a thermal inkjet printhead having an actuator to cause the agent to be selectively delivered to the portions of the layers of the build material, wherein the agent is a coalescing agent.

13. The additive manufacturing system of claim 1 wherein the controller is to cause the agent distributor to be primed while a layer of the layers is solidifying or while a build material distributor is forming the layer of build material.

14. A method comprising:

forming a layer of build material;

using nozzles of an agent distributor, selectively depositing an agent onto a portion of the layer of the build material in a pattern derived from agent delivery control data representing a slice of a three-dimensional object such that the portion is to solidify to form the slice in accordance with the pattern; and while generating the three-dimensional object, periodically priming the agent distributor such that a particle of the build material is blown from the agent distributor through at least one of the nozzles using a pressure spike in the agent distributor.

15. The method of claim 14, wherein priming the agent distributor comprises inflating an inflatable bag inside the agent distributor to cause the pressure spike to blow the particle of the build material out of a nozzle of the agent distributor in which the particle was lodged.

16. The method of claim 14, further comprising:

sensing with a nozzle sensor positioned adjacent a nozzle of the agent distributor when the nozzle is clogged by a particle of build material; and performing the priming of the agent distributor in response to output from the nozzle sensor.

17. The method of claim 14, further comprising moving agent distributor to a priming station where the priming of the agent distributor is performed.

18. The method of claim 14, further comprising, after priming, cleaning a head of the agent distributor with a web.

19. The method of claim 18, further comprising using a different portion of the web for wiping the head of the agent distributor after a previous portion of the web has been so used a predetermined number of times.

20. A non-transitory computer readable storage medium including executable instructions that, when executed by a processor, cause the processor to:

control an agent distributor having nozzles to selectively deliver an agent onto a portion of a formed layer of build material in a pattern derived from agent delivery control data representing a slice of a three-dimensional object such that the portion is to solidify to form the slice according to the pattern; and cause a mass of the build material to be removed from the agent distributor through at least one of the nozzles to prime the agent distributor while generating the three-dimensional object.

* * * * *